United States Patent
Kim

(10) Patent No.: US 10,066,661 B2
(45) Date of Patent: Sep. 4, 2018

(54) BALL JOINT AND METHOD FOR MANUFACTURING SAME

(71) Applicant: CENTRAL CORPORATION, Changwon-si, Gyeongsangnam-do (KR)

(72) Inventor: Young Ki Kim, Changwon-si (KR)

(73) Assignee: CENTRAL CORPORATION, Changwon-si (KR)

( * ) Notice: Subject to any disclaimer, the term of this patent is extended or adjusted under 35 U.S.C. 154(b) by 385 days.

(21) Appl. No.: 14/903,946

(22) PCT Filed: Jul. 17, 2013

(86) PCT No.: PCT/KR2013/006374
§ 371 (c)(1),
(2) Date: Jan. 8, 2016

(87) PCT Pub. No.: WO2015/008879
PCT Pub. Date: Jan. 22, 2015

(65) Prior Publication Data
US 2016/0160907 A1  Jun. 9, 2016

(51) Int. Cl.
*F16C 11/06* (2006.01)
(52) U.S. Cl.
CPC ...... *F16C 11/0685* (2013.01); *F16C 11/0642* (2013.01); *F16C 2220/06* (2013.01)
(58) Field of Classification Search
CPC .......... F16C 11/0685; F16C 11/0642; F16C 11/0623; F16C 11/0628; F16C 11/0633;
(Continued)

(56) References Cited

U.S. PATENT DOCUMENTS 4,478,531 A * 10/1984 Levinson ............... B62D 7/18
                                                280/93.511
5,653,547 A *  8/1997 Teramachi .......... F16C 11/0614
                                                    403/132
(Continued)

FOREIGN PATENT DOCUMENTS

JP       57-203135 S      6/1981
JP       10-131942 A      5/1998
(Continued)

OTHER PUBLICATIONS

International Search Report dated Apr. 16, 2014, issued to International Application No. PCT/KR2013/006374.

*Primary Examiner* — Jonathan P Masinick
(74) *Attorney, Agent, or Firm* — Stein IP, LLC

(57) ABSTRACT

The purpose of the present invention is to provide a ball joint and a method for manufacturing the same, the method injection-molding a ball sheet using a ball stud having a spherical head portion, which has a non-spherical surface formed thereon, thereby simplifying the manufacturing process and improving productivity. In order to implement the purpose, a ball joint according to the present invention comprises: a ball stud (100) provided with a spherical head portion (110); a ball sheet (200) surrounding the outer peripheral surface of the spherical head portion (110) and allowing the ball stud (100) to play within an operating angle range; a cap (300) covering the spherical head portion (110) to form a sealed space between the cap (300) and the outer peripheral surface of the spherical head portion (110); and a socket (400) having an inner space, into which the spherical head portion (110), the ball sheet (200), and the cap (300) are inserted.

10 Claims, 6 Drawing Sheets

(58) Field of Classification Search
CPC ......... F16C 11/0638; Y10T 403/32737; Y10T 403/32721
See application file for complete search history.

(56) References Cited

U.S. PATENT DOCUMENTS

| | | | | |
|---|---|---|---|---|
| 6,561,716 | B1* | 5/2003 | Suzuki | B21K 1/762 403/131 |
| 7,195,398 | B2* | 3/2007 | Budde | B29C 45/1671 384/206 |
| 7,753,611 | B2* | 7/2010 | Ergodan | B62D 7/166 403/138 |
| 7,870,673 | B2* | 1/2011 | Michioka | F16C 11/0633 29/898.043 |
| 8,281,490 | B2* | 10/2012 | Nishide | B21K 1/05 29/898.043 |
| 8,342,769 | B2* | 1/2013 | Elterman | B62D 7/166 403/136 |
| 8,734,044 | B2* | 5/2014 | Schaumann | F16C 11/0638 403/132 |
| 9,422,973 | B2* | 8/2016 | Murata | F16C 11/0633 |
| 2004/0208406 | A1 | 10/2004 | Budde et al. | 384/206 |
| 2012/0141192 | A1 | 6/2012 | Kwon | 403/135 |
| 2017/0023055 | A1* | 1/2017 | Lee | F16C 11/068 |
| 2017/0268564 | A1* | 9/2017 | Kopsie | F16C 11/0628 |

FOREIGN PATENT DOCUMENTS

| | | |
|---|---|---|
| JP | 2001-515191 A | 9/2001 |
| JP | 2003-94129 A | 4/2003 |
| JP | 2005-530107 A | 10/2005 |
| JP | 2007-230507 A | 9/2007 |
| KR | 20-0131652 Y1 | 5/1999 |
| KR | 10-2011-0015814 A | 2/2011 |

* cited by examiner (a)

(b)

(a)

(b)

BALL JOINT AND METHOD FOR MANUFACTURING SAME

CROSS-REFERENCE TO RELATED APPLICATIONS

This application is a national stage of International Application No. PCT/KR2013/006374, filed Jul. 27, 2013, in the Korean Intellectual Property Office, the disclosure of which is incorporated herein by reference.

TECHNICAL FIELD

The present invention relates to a ball joint and a method of manufacturing the same, and more particularly, to a ball joint of which a manufacturing process is simplified by injection molding for forming a ball seat, and a method of manufacturing the same.

BACKGROUND ART

Ball joints are widely used for a connection part having a function of a spheroid joint.

FIG. 1 is a cross-sectional view illustrating a configuration of a conventional ball joint.

As shown in FIG. 1, the ball joint generally includes a ball stud (10) serving as a spheroid joint, a ball seat (20) which surrounds the ball stud (10) to protect the ball stud (10) and controls a friction force acting between the ball stud (10) and a socket (40), the socket (40) in which the ball stud (10) and the ball seat (20) are mounted, a plug (30) which seals the ball stud (10) to prevent a downward movement of the ball stud (10) under the socket (40) by a compressive load, and a dustcover (60) which covers an upper portion of the socket (40) to prevent dust from entering the ball stud (10), and caulking is performed on a lower end portion of the socket (40) and the ball joint is pressed on and inserted into a knuckle or arm to be assembled.

To prevent foreign materials from entering the vicinity of the ball stud (10) mounted in the socket (40), the ball joint is provided with a plug (30) on a lower end of the socket (40) as well as the dustcover (60) for sealing.

To manufacture such a conventional ball joint, the ball stud (10), the ball seat (20), and the plug (30) are inserted into the inside of the socket (40) and coupled with each other by assembling the separately processed ball stud (10) and the ball seat (20), inserting the assembled ball stud (10) and ball seat (20) into the socket (40), covering a lower opening of the socket (40) by the plug (30), and caulking a lower end portion of the socket (40).

However, according to the above manufacturing method, since the ball seat (20) is manufactured separately and then is assembled in the socket (40) using a complex assembly process such as caulking, etc., the productivity thereof can be lowered.

Meanwhile, in order to manufacture a ball seat using an injection molding method, only when the ball stud (10) with only a spherical surface without an aspherical surface is used, rotation of the ball stud (10) can be easily achieved after the ball joint is manufactured.

A conventional method of manufacturing the above-described ball stud provided with only the spherical surface without the aspherical surface will be described with reference to FIG. 2.

FIG. 2A is a view illustrating a ball stud processed by machining, and FIG. 2B is a view illustrating a ball stud manufactured by welding.

Referring to FIG. 2A, the ball stud (10) is provided with a stud portion (12) and a spherical head portion (13), and a portion of the spherical head portion (13) in contact with a ball seat is provided with a spherical surface. In this case, the spherical head portion (13) is formed to have the spherical surface by machining. As a result of the machining, a protruding portion is formed to have a vertex (13a) at the center of a lower end portion of the spherical head portion (13), thereby generating an interference with an inner side surface of the ball seat formed by injection molding, which influences on the quality of a product, and additionally requiring performing a separate treatment process to remove the vertex (13a).

Referring to FIG. 2B, welding and coupling are performed on a welding portion (12a) of the stud portion (12) and a welding portion (13b) of the spherical head portion (13) having a spherical surface. As described above, when the stud portion (12) and the spherical head portion (13) are coupled by welding and a shear load acts on the welding portions, cracks are generated in the welding portions by a shearing action, and thus a welding-type ball stud can be used for only some products subject only to a low shear load.

As described above, for manufacturing the ball stud without the aspherical surface, the above described problems occur, and even when the ball stud is manufactured without the aspherical surface, after the ball seat is formed by injection molding, the ball seat contacts the spherical surface of the spherical head portion throughout, thereby generating an excessive torque while rotating the ball joint.

Further, the dustcover (60) is coupled with an upper end portion of the socket (40). Since a dustcover coupling portion in a groove shape should be formed in the socket (40) for coupling the dustcover (60) using a separate process, many processes are needed for processing the socket (40).

DISCLOSURE

Korean Patent Registration No. 10-906413

Technical Problem

The present invention is directed to providing a ball joint capable of increasing productivity by simplifying a manufacturing process for forming a ball seat on a ball stud having a spherical head portion by injection molding, and a method of manufacturing the same.

Technical Solution

One aspect of the present invention provides a ball joint including a ball stud (100) provided with a spherical head portion (110), a ball seat (200) configured to surround an outer circumferential surface of the spherical head portion (110) so that the ball stud (100) is movable within an operating angle range, a cap (300) configured to cover the spherical head portion (110) so that a sealed space is formed between the cap (300) and the outer circumferential surface of the spherical head portion (110), and a socket (400) having an inner space into which the spherical head portion (110), the ball seat (200), and the cap (300) are inserted.

An aspherical surface (111) may be formed in the spherical head portion (110) and the cap (300) is formed to cover the aspherical surface (111).

The sealed space may be formed between an upper groove formed in an upper surface of the cap (300) and the aspherical surface (111).

The spherical head portion (110) may have a spherical surface, and the sealed space may be formed between a space between the spherical head portion (110) and the upper groove having a curvature greater than that of the spherical head portion (110) and formed in the upper surface of the cap (300).

The upper groove may be provided with a first upper groove (300a) having a curvature the same as that of the spherical head portion (110) and a second upper groove (300b) having a curvature greater than that of the spherical head portion (110).

The socket (400) may be provided with an inlet (410) through which the ball seat (200) is formed by injection molding.

A cap mounting portion (420) may be formed on an inner circumferential surface of the socket (400) provided with the inlet (410) so that the cap (300) is mounted thereon.

An outer circumferential surface (301) of the cap (300) may be provided to communicate with the inlet (410) so as to form a flow path (310) through which solution flows, while forming the ball seat (200) by injection molding.

The flow path (310) may be provided with an inlet groove (311) formed in a lower surface (304) of the cap (300) to be close to the inlet (410) and diffusion paths (312) formed around the inlet groove (311) to communicate with a hollow portion, a space between the outer circumferential surface of the spherical head portion (110) and an inner circumferential surface of the socket (400), while forming the ball seat (200) by injection molding.

A connection path (313) may be formed to connect the diffusion paths (312).

The ball seat (200) may be provided with a seat portion (210) configured to surround the spherical head portion (110) and a cover coupling portion (220) connected to and formed on the seat portion (210) to be coupled with a dustcover.

The cover coupling portion (220) may be formed to surround an outer circumferential surface of an end portion of the socket (400) and is provided with a coupling groove (221) to which the dustcover is coupled.

Another aspect of the present invention provides a method of manufacturing a ball joint including a ball stud (100) having one end provided with a spherical head portion (110), a ball seat (200) which surrounds an outer circumferential surface of the spherical head portion (110) so that the ball stud (100) is movable within an operating angle range, and a socket (400) having an inner space into which the spherical head portion (110) and the ball seat (200) are inserted, and the method includes a) positioning the ball stud (100) so that a cap (300) covers the spherical head portion (110) to form a sealed space between the cap (300) and the spherical head portion (110), and a hollow portion formed between the outer circumferential surface of the spherical head portion (110) and an inner circumferential surface of the socket (400) has a shape of the ball seat (200), b) positioning a mold configured to cover the hollow portion so that the shape of the ball seat (200) is formed, and c) flowing a synthetic resin solution into the hollow portion and molding the ball seat (200).

Advantageous Effects

According to an exemplary embodiment of the present invention, a spherical head portion of a ball stud is covered by a cap for a cover, and then a ball seat is formed by injection molding, thereby a manufacturing process of a ball joint can be simplified, the cost can be reduced, and the productivity can be improved.

MODES OF THE INVENTION

Figure 1:
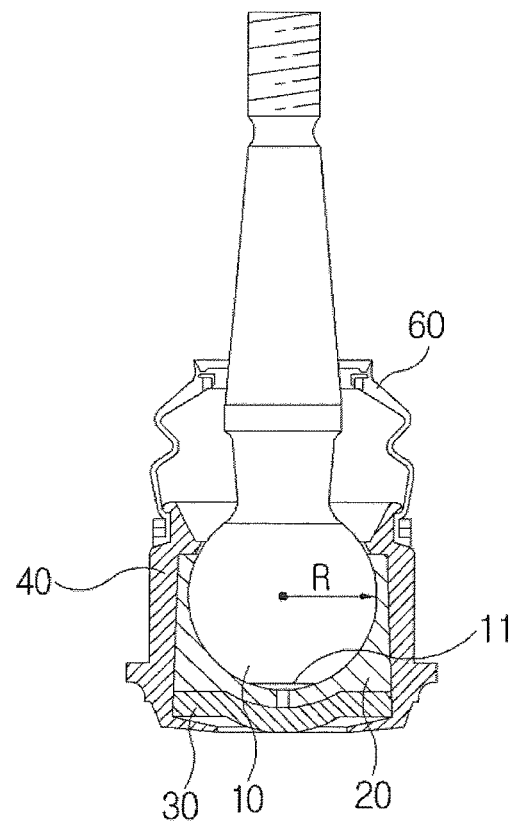
FIG. 1 is a cross-sectional view illustrating a configuration of a conventional ball joint.
Figure 2:
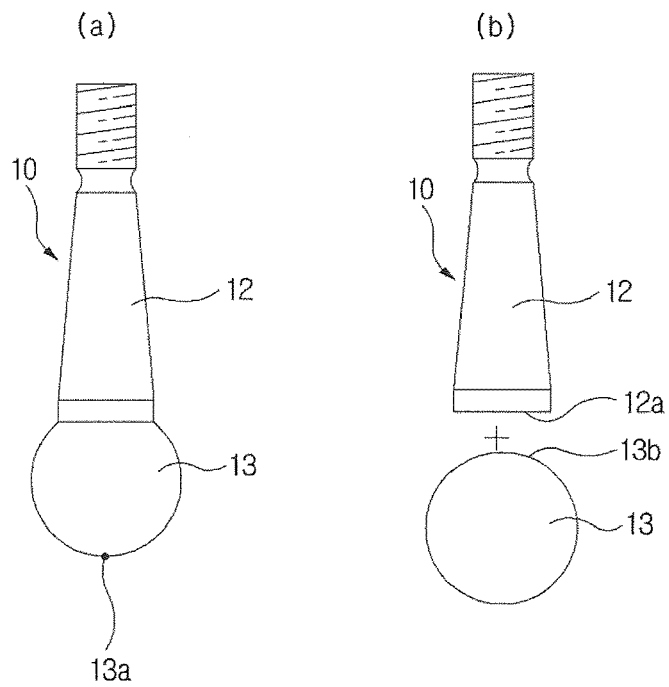
FIG. 2A is a view illustrating a ball stud processed by machining.
FIG. 2B is a view illustrating a ball stud manufactured by welding.

Hereinafter, exemplary embodiments of the present invention will be described in detail. The same numbers in the drawings refer to the same components.

Figure 3:
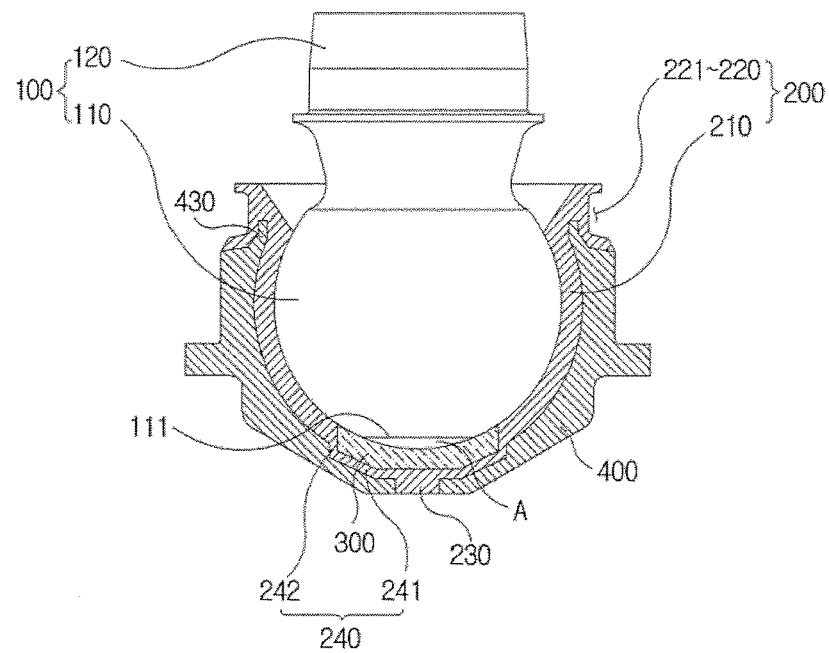
FIG. 3 is a cross-sectional view illustrating a ball joint according to one embodiment of the present invention.
Figure 4:
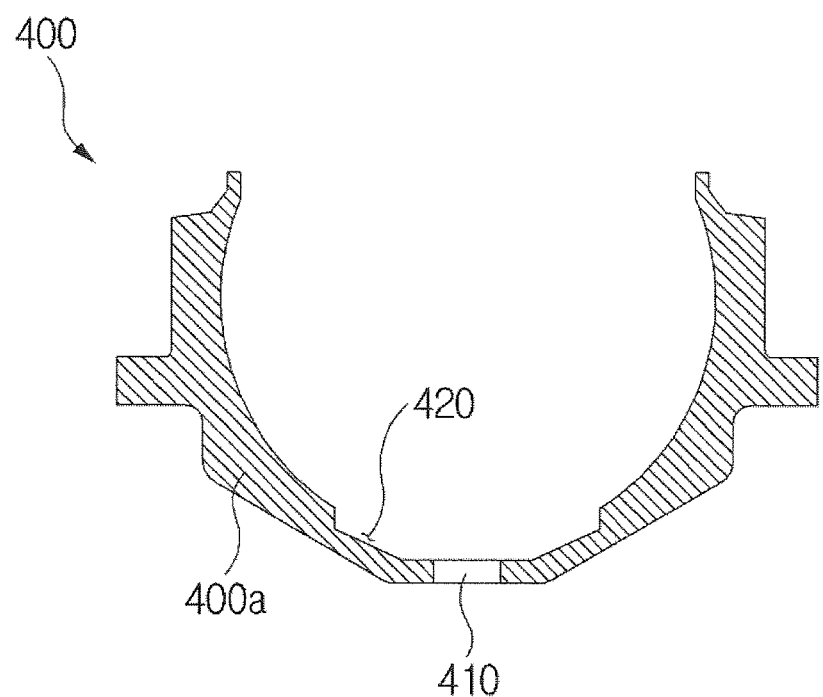
FIG. 4 is a cross-sectional view illustrating a socket according to one embodiment of the present invention.

FIG. 3 is a cross-sectional view illustrating a ball joint according to one embodiment of the present invention, and FIG. 4 is a cross-sectional view illustrating a socket according to one embodiment of the present invention.

The ball joint according to the embodiment of the present invention includes a ball stud 100 having one end provided with a spherical head portion 110 in which an aspherical surface 111 is formed, a ball seat 200 configured to surround an outer circumferential surface of the spherical head portion 110 so that the ball stud 100 is movable within an operating angle range, a cap 300 configured to cover an upper surface of the aspherical surface 111 so that a sealed space is formed between the cap 300 and the aspherical surface 111 of the spherical head portion 110, and a socket 400 having an inner space into which the spherical head portion 110, the ball seat 200, and the cap 300 are inserted.

The ball stud 100 is provided with the spherical head portion 110 having one end portion provided with the aspherical surface 111 and a stud portion 120. The aspherical surface 111 is a portion having a planar shape, and an area thereof in contact the with ball seat 200 varies based on the size of the aspherical surface 111, and thus a torque generated between the aspherical surface 111 and the ball seat 200 may be controlled by suitably setting the size of the aspherical surface 111.

The ball seat 200 is formed by injection molding. When a hollow portion in which the ball seat 200 is formed is formed by fixing the ball stud 100, the cap 300, and the socket 400 at predetermined positions and a melting synthetic resin flows into the hollow portion to perforin injection molding, the ball joint may be manufactured by a simple manufacturing process.

The ball seat 200 is provided with a seat portion 210 configured to surround the spherical head portion 110 and a cover coupling portion 220 connected to and formed on the seat portion 210 to be coupled with a dustcover 60. The seat portion 210 has a spherical surface so that the spherical head portion 110 may rotate on an inner circumferential surface of the spherical surface. The cover coupling portion 220 is formed to surround an outer circumferential surface of an upper end portion 430 of the socket 400 and is provided with a coupling groove 221 to which the dustcover is coupled. As described above, since the cover coupling portion 220 is integrally provided with the ball seat 200 by the injection molding, there is no need for the cover coupling portion on the socket made by using a conventional process separately, and thus a manufacturing process can be simplified.

Further, the ball seat 200 is provided with a protruding portion 230 formed by filling a space having an inlet 410 of the socket 400 with a synthetic resin solution, through which the synthetic resin solution flows during injection molding, and a connection portion 240 formed by filling a flow path 310 of the cap 300 with the synthetic resin solution. The connection portion 240 is provided with a first connection portion 241 formed by an inclined portion of a diffusion path 312 and a second connection portion 242 formed on an end portion of the first connection portion 241 in an upward direction. The protruding portion 230 and the connection portion 240 are portions not in contact with the spherical head portion 110 of the ball stud 100 and are portions formed by a flow path of the synthetic resin solution when the ball seat 200 is formed by the injection molding.

The cap 300 is for forming a sealed space A by covering the aspherical surface 111 of the spherical head portion 110 of the ball stud 100 during injection molding and, for example, may use a synthetic resin material or another material other than the synthetic resin material. In this case, when the size of the aspherical surface 111 is controlled, an area in which the outer circumferential surface of the spherical head portion 110 is in contact with an inner circumferential surface of the seat portion 210 may be controlled, and thus a suitable torque can be set.

The socket 400 is provided with a body 400a configured to surround an inner space at which the ball seat 200 and the spherical head portion 110 are positioned, an inlet 410 formed on a lower end portion of the body 400a so that the melting synthetic resin flows into the inlet 410 when the ball seat 200 is formed by the injection molding, and a cap mounting portion 420 formed at a higher level than the inlet 410 and configured for mounting the cap 300.

Figure 5:
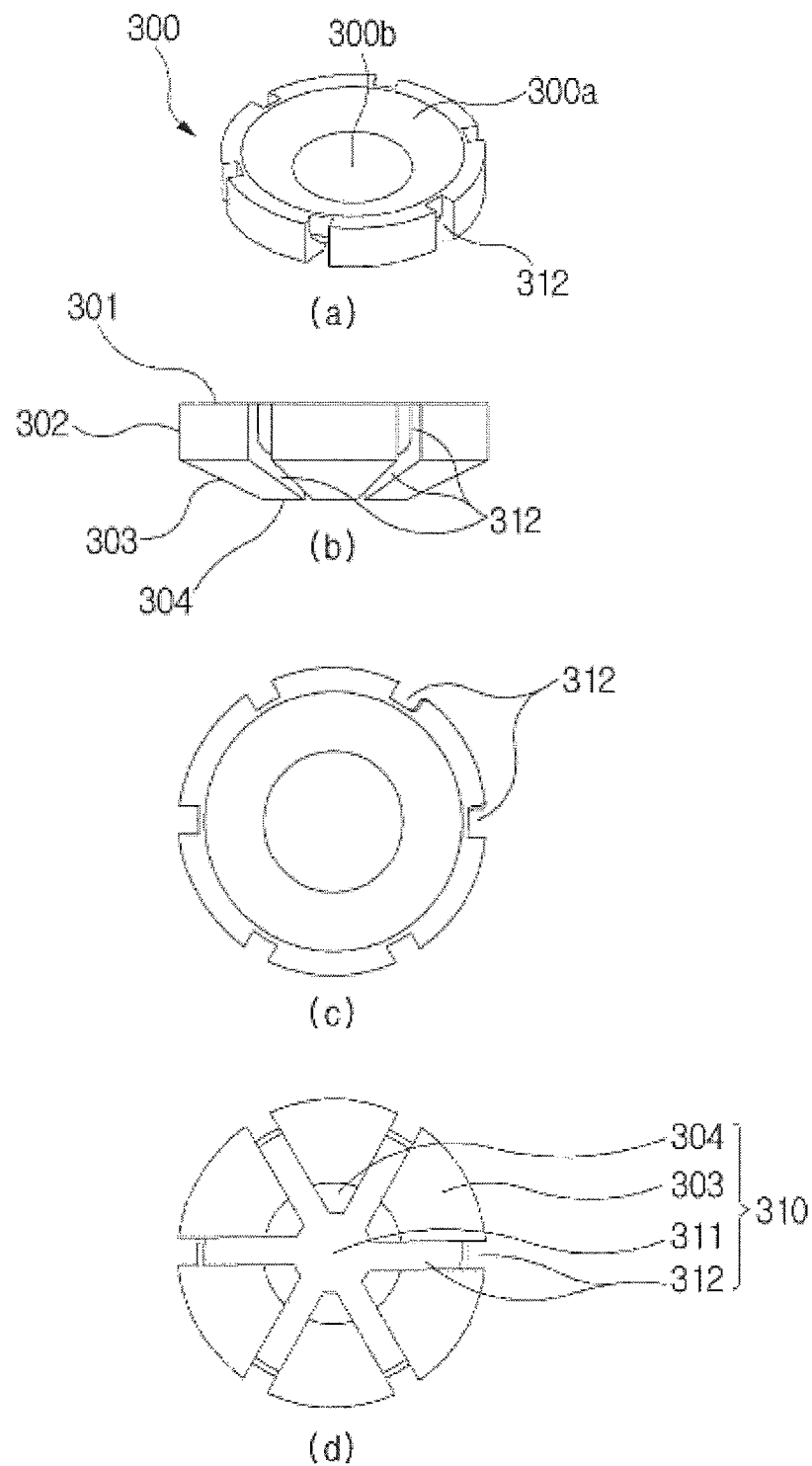
FIG. 5 is a view illustrating a cap according to one embodiment of the present invention.

FIG. 5 is a view illustrating a cap according to one embodiment of the present invention, FIG. 5A is a perspective view, FIG. 5B is a front view, FIG. 5C is a plan view, and FIG. 5D is a bottom view.

The cap 300 according to one embodiment of the present invention forms a sealed space A between the cap 300 and the aspherical surface 111 of the spherical head portion 110 of the ball stud 100 and blocks a synthetic resin solution flowing into the sealed space A during injection molding.

To this end, the cap 300 is provided with upper grooves 300a and 300b concavely formed in an upper surface 301 facing the aspherical surface 111 to form the sealed space A, and the flow path 310, a path through which the synthetic resin solution flows during the injection molding, formed in an outer side surface 302, an inclined surface 303, and a lower surface 304.

The upper grooves 300a and 300b may be provided with a first upper groove 300a having a curvature the same as that of the spherical surface of the spherical head portion 110 and a second upper groove 300b having a curvature greater than that of the spherical surface of the spherical head portion 110, and in this case, the sealed space A is provided with a space between the aspherical surface 111 and the second upper groove 300b.

The flow path 310 is provided with an inlet groove 311, through which a synthetic resin solution flows, formed so that the lower surface 304 is dug to communicate with the inlet 410 of the socket 400 and diffusion paths 312 in which a path is formed around the inlet groove 311 to communicate with a hollow portion which is a space between the outer circumferential surface of the spherical head portion 110 and the inner circumferential surface of the socket 400 when the ball seat 200 is formed by the injection molding.

Thus, the synthetic resin solution which flowed into the inlet 410 of the socket 400 during the injection molding flows into the inlet groove 311 and then flows uniformly along the diffusion paths 312, thereby the synthetic resin solution fills the hollow portion uniformly.

When the cap 300 is mounted on the cap mounting portion 420 of the socket 400, the outer side surface 302, the inclined surface 303, and the lower surface 304 are in contact with an inner side surface of the cap mounting portion 420 of the socket 400, and the inlet 410 of the socket 400 and the hollow portion are communicated with each other through the flow path 310.

Hereinafter, a method of manufacturing a ball joint according to one embodiment of the present invention will be described.

Figure 6:
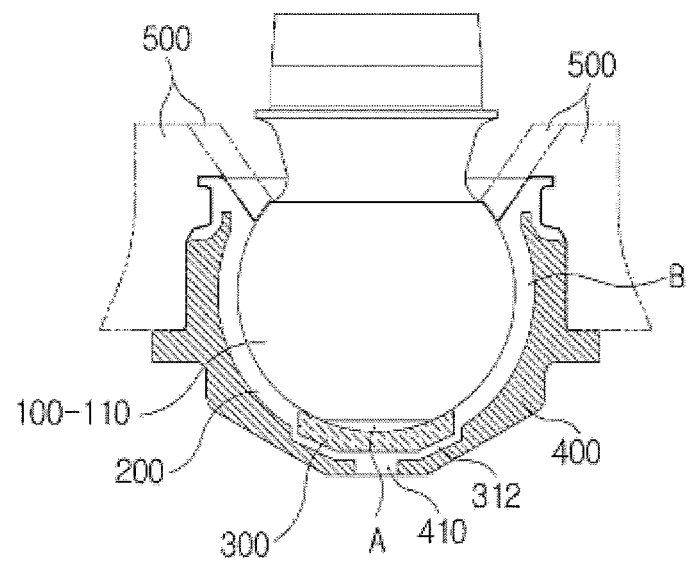
FIG. 6 is a view illustrating a process of manufacturing a ball joint according to one embodiment of the present invention.
Figure 6:
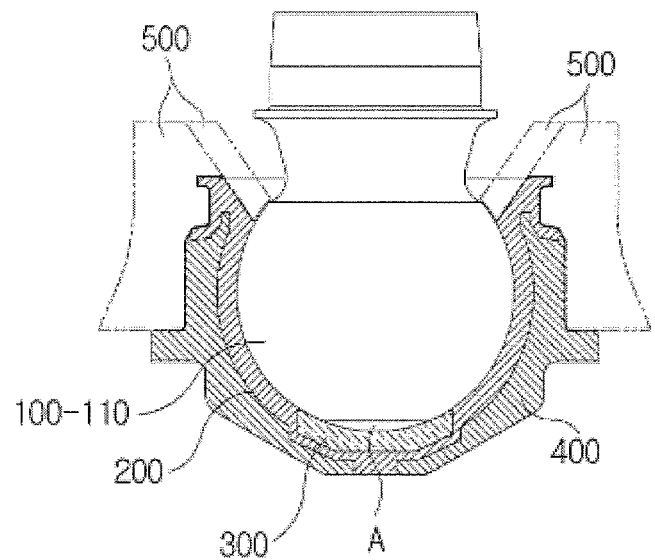
Figure 7:
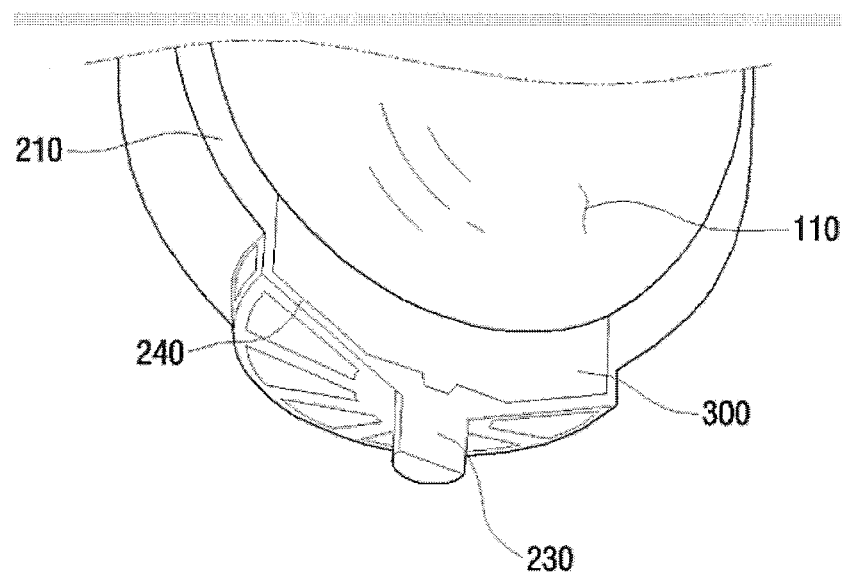
FIG. 7 is a perspective view illustrating an appearance of a ball seat manufactured by one embodiment of the present invention.

FIG. 6 is a view illustrating a process of manufacturing a ball joint according to one embodiment of the present invention, and FIG. 7 is a perspective view illustrating an appearance of a ball seat manufactured by one embodiment of the present invention.

First, the ball stud 100 having one end provided with the spherical head portion 110 in which the aspherical surface 111 is formed is provided, the cap 300 is positioned to cover the aspherical surface 111 so that the sealed space A is formed between the cap 300 and the aspherical surface 111, and the socket 400 is positioned to form a hollow portion B having a shape of the ball seat 200 between the socket 400 and the outer circumferential surface of the spherical head portion 110. In this case, the cap 300 is positioned on the cap mounting portion 420 of the socket 400.

As described above, when the ball stud 100, the cap 300, and the socket 400 are fixed at predetermined positions, a mold 500 configured to cover the hollow portion B is positioned so that the shape of the ball seat 200 is formed.

At this time, when a synthetic resin solution flows through the inlet 410 formed in the socket 400, the synthetic resin solution passes through the flow path 310 and fills the hollow portion B, and then when a cooling process is performed and the mold is separated, the ball joint provided with the ball seat 200 is formed completely. FIG. 7 illustrates a shape when the ball seat 200 is formed completely.

Figure 8:
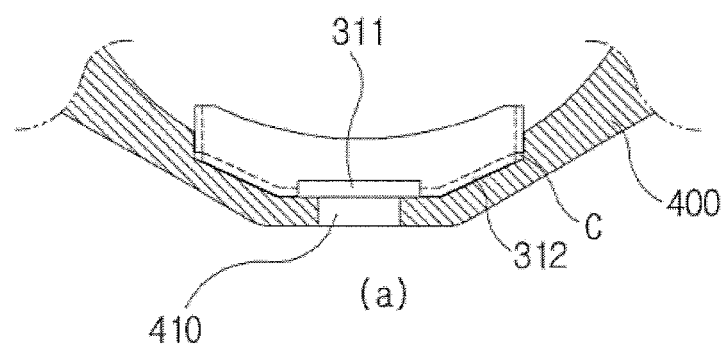
FIG. 8 is a view illustrating a cap according to another embodiment of the present invention.
Figure 8:
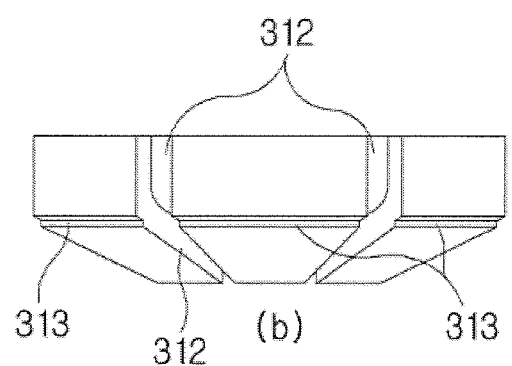

FIG. 8 is a view illustrating a cap according to another embodiment of the present invention.

The embodiment shown in FIG. 8 illustrates a case including connection paths 313 configured to connect the adjacent diffusion paths 312 to each other.

A synthetic resin solution flows from the inlet groove 311 to the diffusion paths 312 during injection molding, and some of the solution, which flowed into the diffusion paths 312, flows into the connection path 313 to form a part of the body of the ball seat 200.

The synthetic resin solution uniformly flows into the hollow portion A through the connection paths 313 during the injection molding.

Figure 9:
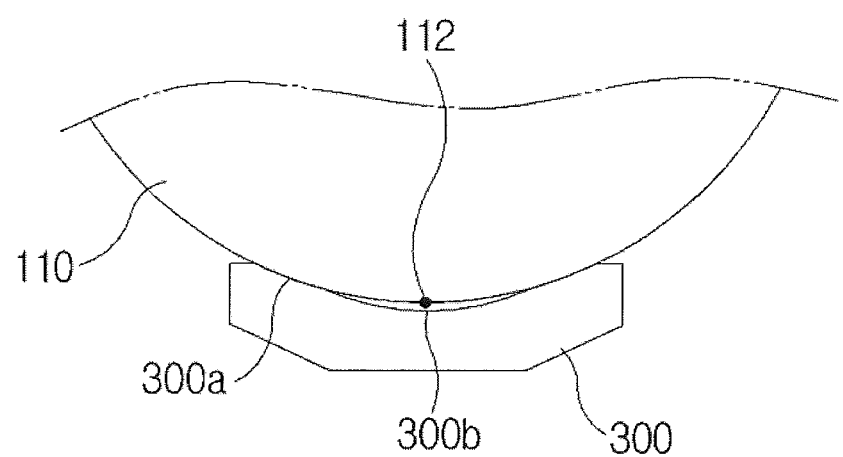
FIG. 9 is a view when a spherical head portion of a spherical surface of a ball joint according to another embodiment of the present invention is covered by the cap.

FIG. 9 is a view when a spherical head portion of a spherical surface of a ball joint according to another embodiment of the present invention is covered by the cap.

The embodiment of the ball joint provided with the aspherical surface has been described with reference to FIGS. 3 to 8, and another embodiment of the present invention will be described for a case in which the spherical head portion is provided with only spherical surface.

An upper groove formed in an upper surface of a cap 300 is provided with a first upper groove 300a having a curvature the same as that of a spherical head portion 110 and a second upper groove 300b having a curvature greater than that of the spherical head portion 110, and a sealed space is formed between the second upper groove 300b and an outer circumferential surface of the spherical head portion 110.

In this case, even when a protruding vertext 112 generated by processing the spherical head portion 110 provided with the spherical surface is formed, an interference with the cap 300 provided with the second upper groove 300b is not generated, thereby preventing the decrease in the quality of a product.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

INDUSTRIAL APPLICABILITY

The present invention relates to a ball joint including a ball seat and a method of manufacturing the same, a manufacturing process thereof is simplified by forming a ball stud having a spherical head portion together with a ball seat by injection molding, and thus the productivity thereof can be improved.

The invention claimed is:

1. A ball joint comprising:
a ball stud provided with a spherical head portion;
a ball seat configured to surround an outer circumferential surface of the spherical head portion so that the ball stud is movable within an operating angle range;
a cap configured to cover the spherical head portion so that a sealed space is formed between the cap and the outer circumferential surface of the spherical head portion; and
a socket having an inner space into which the spherical head portion, the ball seat, and the cap are inserted,
wherein the socket is provided with an inlet through which the ball seat is formed by injection molding,
wherein an outer circumferential surface of the cap is provided to communicate with the inlet so as to form a flow path through which solution flows, while forming the ball seat by injection molding.

2. The ball joint of claim 1, wherein an aspherical surface is formed in the spherical head portion, and the cap is formed to cover the aspherical surface.

3. The ball joint of claim 2, wherein the sealed space is formed between an upper groove formed in an upper surface of the cap and the aspherical surface.

4. The ball joint of claim 1, wherein the spherical head portion has a spherical surface, and the sealed space is formed between the spherical head portion and the upper groove.

5. The ball joint of claim 4, wherein the upper groove is provided with a first upper groove having a curvature the same as that of the spherical head portion and a second upper groove having a curvature greater than that of the spherical head portion.

6. The ball joint of claim 1, wherein a cap mounting portion is formed on an inner circumferential surface of the socket provided with the inlet so that the cap is mounted thereon.

7. The ball joint of claim 1, wherein the flow path is provided with an inlet groove formed in a lower surface of the cap to be close to the inlet and diffusion paths formed around the inlet groove to communicate with a hollow portion, a space between the outer circumferential surface of the spherical head portion and an inner circumferential surface of the socket while forming the ball seat by injection molding.

8. The ball joint of claim 7, wherein a connection path is formed to connect the diffusion paths.

9. The ball joint of claim 1, wherein the ball seat is provided with a seat portion configured to surround the spherical head portion and a cover coupling portion connected to and formed on the seat portion to be coupled with a dustcover.

10. The ball joint of claim 9, wherein the cover coupling portion is formed to surround an outer circumferential surface of an end portion of the socket and is provided with a coupling groove to which the dustcover is coupled.

* * * * *